(12) United States Patent
Cui et al.

(10) Patent No.: US 12,363,579 B1
(45) Date of Patent: Jul. 15, 2025

(54) METHOD AND COMMUNICATION APPARATUS FOR CSI FEEDBACK, AND COMPUTER-READABLE STORAGE MEDIUM

(71) Applicant: TP-Link Systems Inc., Irvine, CA (US)

(72) Inventors: Yaoshen Cui, Shenzhen (CN); Haozheng Li, Chengdu (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/822,188

(22) Filed: Aug. 31, 2024

(51) Int. Cl.
*H04W 24/10* (2009.01)
(52) U.S. Cl.
CPC .................... *H04W 24/10* (2013.01)
(58) Field of Classification Search
CPC .................................................. H04W 24/10
See application file for complete search history.

(56) References Cited

U.S. PATENT DOCUMENTS

| | | | |
|---|---|---|---|
| 2011/0269481 A1* | 11/2011 | Halfmann | H04W 64/00 455/456.1 |
| 2014/0301240 A1 | 10/2014 | Park | |
| 2019/0058560 A1* | 2/2019 | Chen | H04B 7/0417 |
| 2020/0136700 A1 | 4/2020 | Bogale | |
| 2022/0353725 A1* | 11/2022 | Jin | H04W 24/10 |
| 2023/0421219 A1* | 12/2023 | Jiang | H04B 7/0658 |

FOREIGN PATENT DOCUMENTS

| | | |
|---|---|---|
| CN | 116366111 A | 6/2023 |
| WO | 2023197298 A1 | 10/2023 |

* cited by examiner

*Primary Examiner* — Walli Z Butt
*Assistant Examiner* — Thad N Defauw
(74) *Attorney, Agent, or Firm* — Loeb & Loeb LLP

(57) ABSTRACT

A method for CSI feedback and a computer-readable storage medium are provided. The method includes: predicting a first predicted CSI for a second time instant based at least on a first measured CSI for a first time instant; obtaining a second measured CSI for the second time instant; and determining a compression level for a third measured CSI for a third time instant after the second time instant based at least on comparison between the first predicted CSI and the second measured CSI. A most suitable compression level may be selected according to the real-time CSI prediction accuracy and/or the assistance of spatial parameters while overhead for CSI feedback may be reduced.

19 Claims, 5 Drawing Sheets

METHOD AND COMMUNICATION APPARATUS FOR CSI FEEDBACK, AND COMPUTER-READABLE STORAGE MEDIUM

TECHNICAL FIELD

The present disclosure relates to a field of wireless communication, and more particularly, to a method and communication apparatus for channel state information (CSI) feedback and computer-readable storage medium.

BACKGROUND

At present, in the communication between a terminal device (e.g., Station (STA)) and an access network device (e.g., Access point (AP)), the access network device can obtain the channel quality through Channel State Information (CSI) feedback from the terminal device. CSI refers to channel properties of a communication link in a wireless communications network. For example, the access network device obtains the information related to the channel quality through the CSI feedback process and configures the data transmission solution according to the information related to the channel quality. As the communication scenarios of the terminal device and the access network device gradually become complex and variable, the existing CSI feedback scheme is difficult to adapt to the variable communication scenarios, which is not effective for improving the efficiency of data transmission. Therefore, the CSI feedback solution needs to be further studied.

SUMMARY

According to an aspect of present disclosure, a method for channel state information (CSI) feedback is provided. The method comprises: predicting a first predicted CSI for a second time instant based at least on a first measured CSI for a first time instant; obtaining a second measured CSI for the second time instant; and determining a compression level for a third measured CSI for a third time instant after the second time instant based at least on comparison between the first predicted CSI and the second measured CSI.

According to another aspect of present disclosure, an apparatus for channel state information (CSI) feedback is provided. The apparatus comprises: one or more processors; and one or more memories having stored thereon a computer program which, when executed by the one or more processors, causes the one or more processors to: predict a first predicted CSI for a second time instant based at least on a first measured CSI for a first time instant; obtain a second measured CSI for the second time instant; and determine a compression level for a third measured CSI for a third time instant after the second time instant based at least on comparison between the first predicted CSI and the second measured CSI.

According to another aspect of present disclosure, a computer-readable storage medium on which computer programs are stored is provided. When the computer programs are executed by a processor, the processor is caused to perform the steps of predicting a first predicted CSI for a second time instant based at least on a first measured CSI for a first time instant; obtaining a second measured CSI for the second time instant; and determining a compression level for a third measured CSI for a third time instant after the second time instant based at least on comparison between the first predicted CSI and the second measured CSI.

According to the embodiments of present application, a compression level may be selected according to the real-time CSI prediction, thus the overhead of the transmission may be reduced, and at the same time the compressed CSI is suitable for current channel condition. In addition, the spatial parameter information (such as angle, time delay and speed) is introduced for assisting the CSI predication and compression level determination, therefore, the compression level is more appropriate, and thus the accuracy of the recovered CSI from the compressed CSI may be improved.

BRIEF DESCRIPTION OF THE DRAWINGS

The drawings illustrated here are provided for further understanding the present disclosure and constitute a part of the present disclosure, the exemplary embodiments of the present disclosure and description thereof are used for explaining the present disclosure, rather than improperly limiting the present disclosure. In the drawings.

DETAILED DESCRIPTION

Figure 1:
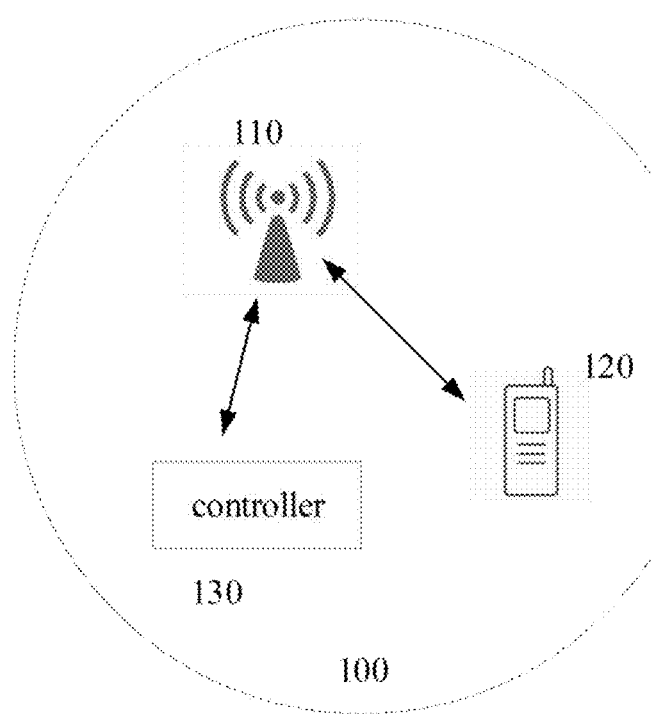
FIG. 1 schematically illustrates a schematic diagram of a communication system according to an embodiment of present disclosure.

In order to make those skilled in the art to better understand the solution of the present disclosure, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those ordinarily skilled in the art can acquire other embodiment(s), without any inventive labor, which should be within the scope of the present disclosure.

It should be noted that the terms "first", "second", etc. in the specification and the claims of the present disclosure, as well as the above-described accompanying drawings, are used to distinguish similar objects, without necessarily describing a specific order or sequence. It should be understood that the data used in this way may be interchanged in appropriate cases, so that the embodiments of the present disclosure described here may be implemented in an order other than those illustrated or described here. In addition, the terms "including" and "having", as well as any variations thereof, are intended to cover non-exclusive inclusion, for example, processes, methods, systems, products, or devices that include a series of steps or units, need not be limited to those clearly listed steps or units, but may include other steps or units that are not clearly listed or inherent to these processes, methods, products, or devices.

CSI usually needs to be estimated at the receiver and be fed back to the transmitter. The amount of CSI data fed back to the transmitter may require a large amount of time and/or bandwidth resources for feeding back the CSI to the transmitter. Accordingly, technical solutions for reducing CSI feedback overhead may be desired.

In order to reduce the overhead for the transmission of the CSI feedback, in an implementation, the machine learning-based method (e.g., deep learning, compressive sensing, or the like) are used to directly compress the CSI (e.g., in a format of CSI matrix) by encoding and decoding the CSI, thus reducing the dimension of the CSI for feeding it back to the receiving side. In another implementation, quantization compression methods, such as Beamforming in 802.11 protocol, compress the CSI by quantizing the angle. In addition, in another implementation, the overhead for the transmission of the CSI is reduced through the transmission of channel prediction error, which specifically includes the receiving side using RLS algorithm and historical CSI data to predict a CSI, and a prediction error is obtained, and the minimum value of this error and the original CSI is selected for feedback.

However, there are disadvantages of the above implementations. For example, the compression method based on the deep learning or compressive sensing has a high computational complexity, and the real-time performance is difficult to meet; moreover, compressive sensing algorithms require the channel to have low-rank characteristics, which is difficult to meet when the quantity of antennas is small and the bandwidth of the channel is narrow. The quantization compression method as recited in the 802.11 protocol is rigid and fixed, and quantization will cause great information loss; the greater the quantification degree, the greater the loss, and if the quantization degree is small, the compression effect is not good. For the method based on the transmission of prediction error, the value of each element in the CSI feedback (e.g., CSI matrix) is reduced and then reduce the bits used by each element under the condition that the transmission dimension of CSI is unchanged, so as to realize CSI feedback compression; however, due to the inherent influence of system time offset and frequency offset, the predicted CSI is prone to large overall deviation, and the resulted prediction error is even greater than the value of the original CSI, so it can only be transmitted as a complete CSI, that is, the compression is not realized.

In view of the above, embodiments of the present disclosure provide an improved solution for CSI feedback.

FIG. 1 illustrates a schematic diagram of a communication system according to an embodiment of present disclosure.

As shown in FIG. 1, the communication system may include an access point (AP) 110, a station (STA) 120, and optionally a controller 130. The controller may be any device capable of processing data and signals, and may be implemented in hardware, software and a combination thereof. The controller may be a server for example. The controller 130 may be communicatively connected with the AP 110, and may communicate information with the AP. The AP 110 may be communicatively connected with the STA 120, and transmit the information originated from the AP 110 to the STA 120, or relay the information originated from the one or more other communication entities to the STA 120. Even though there is only one AP, one STA and one controller shown in FIG. 1, the number of APs, the number of STAs and the number of controllers included in the communication system are not limited.

In FIG. 1, the AP 110 may transmit a signal to the STA 120, to trigger the STA 120 to estimate the channel state information (CSI) of the communication link therebetween. For example, the estimation of CSI at the STA 120 may be triggered by a reference signal or a detection frame from the AP 110. For example, the AP 110 may transmit a null data packet (NDP) frame to the STA, the STA measures the CSI, and then feeds the measured CSI back to the AP 110. Such a CSI is also referred to as a CSI feedback hereinafter. If there is a controller in the communication system, the STA 120 may also transmit the CSI feedback to the controller via the AP. The CSI feedback may be in a format of matrix (also referred to as CSI matrix herein), and the dimension of the CSI feedback and the overhead for the transmission of the CSI feedback may be related to the number of receiving and transmitting antennas of the AP 110 and the STA 120, and/or to the number of the subcarriers within the bandwidth of the communication link, and the total overhead for the transmission of the CSI feedback may be related to the transmission frequency of the CSI feedback.

In wireless communication technical field, CSI represents the wireless channel response, and may be expressed as a CSI matrix. For a MIMO channel with a number Nt of transmit antennas, a number Nr of receive antennas and a number Nc of subcarriers, the channel matrix of the $Nc_i$-th subcarrier can be expressed as:

$$h_{Nc_i} = \begin{bmatrix} h_{Nc_i,1,1} & \cdots & h_{Nc_i,N_r,1} \\ \vdots & \ddots & \vdots \\ h_{Nc_i,N_r,1} & \cdots & h_{Nc_i,N_r,N_t} \end{bmatrix}$$

where $$h_{Nc_i,Nt_i,Nr_j} = \sum_{m=1}^{M} \beta_{Nc_i,Nt_i,Nr_j,m} e^{-j2\pi f_{Nc_i} \tau_{Nc_i,Nt_i,Nr_j,m}} e^{j2\pi f_{Nc_i} v/c},$$

and where $\beta_{Nc_i,Nt_i,Nr_j,m}$ refers to the amplitude of the channel from the $Nt_i$-th transmit antenna to the $Nr_j$-th receiving antenna on the m-th multipath component, and $f_{Nc_i}$ is the center frequency of the $Nc_i$-th subcarrier, $\tau_{Nc_i,Nt_i,Nr_j,m}$ is the time delay on the corresponding m-th multipath component, v is the relative speed between the two antennas, and c is the speed of light, and $-f_{Nc_i}v/c$ is the corresponding Doppler frequency shift. CSI for the MIMO channel is a complete three-dimensional channel matrix (tensor) of Nt*Nr*Nc:

$$H=[h_1 \ldots h_{N_c}]$$

H may be related to the channel model and spatial model, and may be derived based on the transmit signal information and the response information at the receiving side. From the H, the amplitude and phase corresponding to each matrix element for each pair of transmit antenna and receive antenna on each subcarrier may be derived.

In the context of present disclosure, the expression of "a CSI for a time instant" or "a measured CSI for a time instant" or its variant means that the CSI is estimated or measured in response to a received trigger (e.g., a reference signal or a detection frame) transmitted at the time instant, and it may be compressed for transmission. The expression of "a predicted CSI for a time instant" or its variant means that the CSI is a prediction for a CSI to be measured in response to a received trigger transmitted at the time instant.

In the context of present disclosure, the expression of "compress" for CSI or its variant means the compression for CSI with respect to the frequency domain, time domain, spatial domain (the dimension of antennas), or the dimension, scale or size of the CSI. For example, if a measured CSI for a time instant Tn is compressed, n being an integer greater or equal to 1, it may indicate that the dimension or size of the compressed CSI is reduced, or the time interval between two CSI feedbacks is prolonged relative to the time interval when no compression is performed, e.g., the transmission of the compressed CSI is delayed.

In the context of present disclosure, the expression of "obtain" may represent any of expressions "determine", "acquire", "measure", "evaluate", "estimate", "calculate", "adjust" and "update", etc., as long as the understanding is not contradictory with the contents elsewhere.

As mentioned above, the overhead for the transmission of the CSI feedback needs to be reduced, and the CSI feedback needs to be compressed flexibly for different channel qualities.

Figure 2:
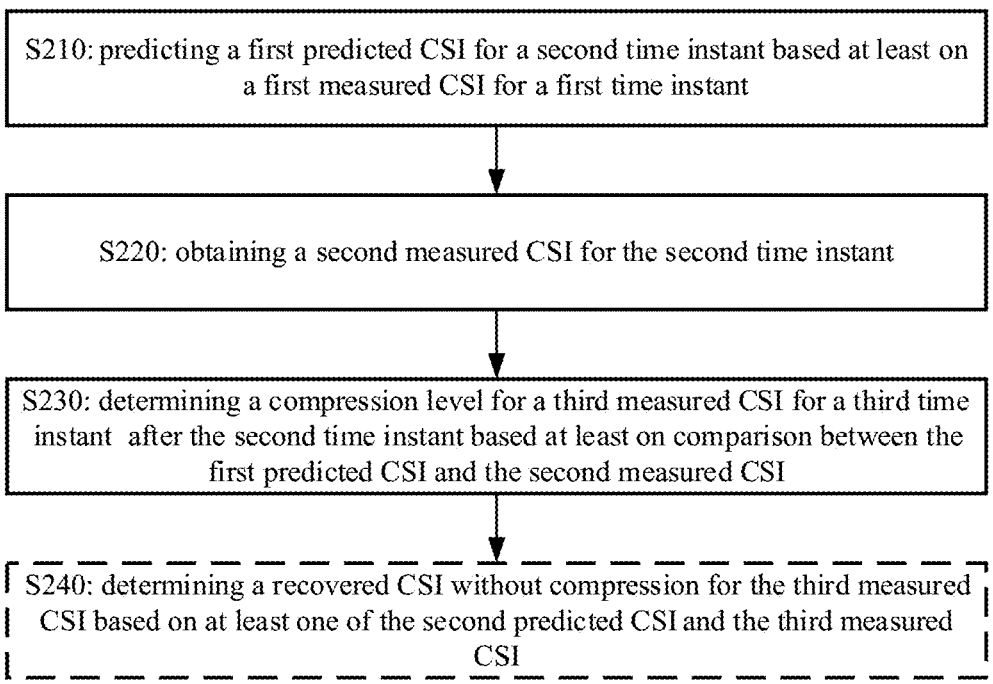
FIG. 2 schematically illustrates a flow chart of a method for channel state information (CSI) feedback according to an embodiment of present disclosure.

FIG. 2 illustrates a flow chart of a method for channel state information (CSI) feedback according to an embodiment of present disclosure, which includes the determination of the compression level for the CSI feedback.

The method shown in FIG. 2 may be performed in a communication apparatus, such as the AP, the STA or the controller as shown in FIG. 1.

As shown in FIG. 2, in step S210, a first predicted CSI for a second time instant T2 is predicted based at least on a first measured CSI for a first time instant T1.

For example, for the first time instant T1, the AP transmits an NDP frame to the STA, and the STA is triggered to estimate or measure the corresponding CSI and feeds it back to the AP. At this time, the measured CSI may be of full size, i.e., without compression. This measured CSI for the first time instant T1 is recorded as $CSI_{T1}$. In some examples, the STA may not feedback the measured $CSI_{T1}$, but store and record the measured $CSI_{T1}$ locally for subsequent processing. In some examples, a controller may also receive the measured $CSI_{T1}$ from the STA.

Then, the AP may predict the CSI for the second time instant (represented as T2=T1+t, where t represents the prediction interval or detection interval, etc.) to obtain the predicted CSI (represented as $\widehat{CS}\,I_{T2}$) for the second time instant T2, based at least on the previously measured $CSI_{T1}$ for the first time instant T1 (e.g., may further based on the spatial parameter information and/or historical CSI data, as will be described later). In some examples, the predicted CSI for the second time instant T2 may also be predicted at the STA locally or at the controller based on the measured $CSI_{T1}$.

In step S220, a second CSI for the second time instant T2 is obtained.

Optionally, at the second time instant T2, the AP transmits an NDP frame to the STA, and the STA is triggered to estimate or measure the corresponding CSI, i.e., the STA may measure the second CSI in response to an NDP frame from the AP at the second time instant T2, and may store the measure second CSI locally. When the second measured CSI is required, the STA may obtain it from the storage. At this time, the CSI may be of full size, i.e., without compression. This second measured CSI for the second time instant T2 is recorded as $CSI_{T2}$. In some examples, the AP or the controller may receive the second measured CSI from the STA.

In step S230, a compression level for a third measured CSI for a third time instant T3 after the second time instant T2 is determined based at least on comparison between the first predicted CSI and the second measured CSI.

Optionally, the difference between the first predicted CSI and the second measured CSI may be determined, and the difference may be related to the prediction accuracy or the prediction status, which may be impacted by the channel change, e.g., the movement of the STA relative to the AP. Then the compression level for the third measured CSI for the third time instant T3 after the second time instant T2 is determined based on a correspondence between differences and compression levels of a compression level set.

For example, the difference between the first predicted CSI $\widehat{CS}\,I_{T2}$ and the second measured CSI $CSI_{T2}$ may be calculated based on various manners, for example but not limited to, Mean Squared Error (MSE) or Normalized Mean Squared Error (NMSE), etc., for example, $$NMSE_{CSI} = \frac{\|\widehat{CS}I_{T2} - CSI_{T2}\|^2}{\|CSI_{T2}\|^2}.$$

The compression level set includes a plurality of compression levels, each value range of the difference corresponds to a compression level or a group of compression levels. The lower the compression level, the lower degree or extent that the corresponding CSI is compressed. For example, if the difference is within a value range from 0.8 to 1, which indicates that the prediction accuracy is low, the third measured CSI measured by the STA may not be compressed or may be compressed in a relatively low degree, and then the corresponding compression level may be determined as the minimum compression level or selected from the group of minimum compression levels (e.g., further based on the spatial parameter information, as will be described in the following). On the other hand, if the difference is within a value range from 0 to 0.1, which indicates that the prediction accuracy is high, the third measured CSI measured by the STA may be compressed in a relatively high degree, and then the corresponding compression level may be determined as the maximum compression level or selected from the group of maximum compression levels (e.g., further based on the spatial parameter information).

For example, once the compression level is determined (e.g., by the STA, the AP, or the controller) and the compression level is known to the communication entity (e.g., the STA) which will generate the compressed CSI, after the third measured CSI is measured, the third measured CSI may be compressed and the (compressed) third measured CSI may be transmitted to the receiving side (e.g., the AP). The compressed CSI may be used to predict the predicted CSI for the fourth time instant. In present application, the third measured CSI or later measured CSI received or obtained at the AP side may refer to the compressed third measured CSI, and the third measured CSI or later measured CSI obtained or measured at the STA side may refer to the third measured CSI without compression or to be compressed based on the compression level.

In addition, after the second measured CSI for the second time instant T2 is obtained, and as mentioned above, the compression level may be determined. The time instant T3 may be determined based on the fixed time interval between two CSI feedback if the compression level is not related to the time domain or based on the compression level if the compression level is related to the time domain. A second predicted CSI $\widehat{CS}\,I_{T3}$ for the third time instant T3 is predicted based at least on the second measured CSI $CSI_{T2}$ for the second time instant T2, and the compression level for the third measured CSI is adjusted to be used for a measured CSI following the third measured CSI, based on comparison between the second predicted CSI $\widehat{CS}\,I_3$ and the third measured CSI $CSI_{T3}$. The adjusted compression level is used for a fourth measured CSI $\widetilde{CS}\,I_{T4}$ for the fourth time instant T4.

That is, the operations of CSI prediction, CSI estimation, CSI compression, and compression level adjustment may repeat after an initial compression level is determined, e.g., from an ordinal third time instant.

In some examples, after the AP obtains a compressed CSI, and the AP needs to perform the CSI prediction for a next time instant (e.g., the fourth time instant after the third time instant), the AP may also predict the CSI for the next time instant based at least on the compressed CSI (even if in the case of the reduced number of subcarriers and/or dimension of the antennas), and the predicted CSI may be not of full size (e.g., if prediction is not based on the recovered CSI) or may be of full size (e.g., if prediction is not based on the recovered CSI). In an instance, assuming the compression for the CSI is performed based on the reduced number of subcarriers, the AP receives the compressed CSI for T3, including CSI information related to subcarriers 1, 3 and 5, if needed, the AP may perform CSI recovery to obtain a complete CSI related to subcarriers 1, 2, 3, 4, 5 and 6 by interpolation or other methods. For CSI prediction, the AP may predict the CSI for the next time instant T4 based on the current CSI (related to the actual subcarriers 1, 3, 5) and possible historical CSI and/or spatial parameter information. CSI information related to subcarriers 2, 4, and 6 may be estimated values based on calculation for subcarriers 1, 3, and 5, and may be used as an intermediate step to predict the CSI for T4, but the actual valid information is only CSI information related to subcarriers 1, 3, and 5.

Then AP receives a new compressed CSI for T4, including CSI information related to subcarriers 2, 4 and 6. The selected subcarriers for compression may be negotiated or communicated between the AP and the STA. Similarly, the AP may perform CSI recovery to obtain a complete CSI related to subcarriers 1, 2, 3, 4, 5 and 6 by interpolation or other methods if needed. Sometimes, when recovering, the AP may use the predicted CSI for the T4 to correct the recovered complete CSI, especially in the case of the compression level is high so that the interpolation or other methods may not have a good result. For the prediction accuracy estimation, the comparison between the current compressed CSI for T4 related to subcarriers 2, 4 and 6 (actual values) and the predicted CSI related to subcarriers 2, 4 and 6 is performed to determine the prediction accuracy, so as to adjust the current compression level. In this case, the predicted CSI related to subcarriers 2, 4 and 6 for T4 is predicted from the estimated values based on calculation (e.g., using interpolation) on the compressed CSI for T3 related to subcarriers 1, 3, and 5. In other cases, if the new compressed CSI includes CSI information related to at least some subcarriers of subcarriers 1, 3 and 5, the predicted CSI related to the at least some subcarriers of subcarriers 1, 3 and 5 may be used to determine the prediction accuracy, and the predicted CSI related to the at least some subcarriers of subcarriers 1, 3 and 5 is predicted from the actual values of the at least some subcarriers of subcarriers 1, 3, and 5 at the T3 for T4.

That is, the AP may have the ability of predicting CSI information related to all the subcarriers, no matter based on the actual values from the compressed CSI and/or the estimated values (e.g., using interpolation) from the compressed CSI.

In another aspect, if the STA performs the CSI prediction for a next time instant, the STA may predict the CSI for the next time instant based at least on the newly measured CSI.

The CSI prediction and prediction accuracy determination regarding the reduced dimension of antennas and the bandwidth (related to a part of consecutive subcarriers) are similar to the above process for the reduced number of subcarriers.

For example, once the measured CSI for a time instant Tm is obtained, the measured CSI for the time instant Tm may be compressed based on current compression level Lm previously determined to obtain a compressed CSI for the time instant Tm. For example, at the time instant Tm, the AP transmits an NDP frame to the STA (which may carry or may be transmitted with the information on the current compression level Lm and optionally the selected subcarriers and/or the antennas for compression determined at the AP), and the STA is triggered to measure the corresponding CSI for the time instant Tm, compresses the measured CSI, and transmits the compressed CSI (and optionally the selected subcarriers and/or the antennas for compression determined at the STA) to the AP.

Optionally, as an example, the spatial parameter information may be introduced to assist the CSI predication, prediction accuracy determination and/or the compression level determination. The spatial parameter information can help improve performance and efficiency, and provide channel spatial information.

For example, the method 200 may further include the step: determining spatial parameter information for the first time instant based at least on the first measured CSI for the first time instant. In this way, the first predicted CSI for the second time instant is predicted further based on the determined spatial parameter information for the first time instant in addition to the first measured CSI for the first time instant.

In some cases, if the AP receives the compressed CSI for a certain time instant (e.g., the third time instant), and the AP needs to perform the determination of the spatial parameter information for the certain time instant, the AP may determine the spatial parameter information for the certain time instant based at least on the compressed CSI or the recovered CSI for the certain time instant. In some other examples, if the STA performs the determination of the spatial parameter information for the certain time instant, the STA may determine the spatial parameter information for the certain time instant based at least on the newly measured CSI for the certain time instant.

For example, the spatial parameter information may be information on spatial parameters, such as physical parameters of the angle, distance and speed, etc. related to the channel condition, and may be represented as a spatial parameter vector $V_T$.

For example, the spatial parameter information or the spatial parameter vector $V_T$ may include the following:
1) Tx-Rx angle estimation: it may include the Direction of Arrival (DoA), Angle of Departure (AoD), and/or the Angle of Arrival (AoA), etc.;
2) Tx-Rx distance (d) estimation: it may be used to estimate corresponding distance between each pair of transmit antenna and receive antenna, which can be estimated by Received Signal Strength Indication (RSSI) or the time of flight (ToF);
3) Relative speed (v) estimation: if any communication entity (e.g. the AP and/or the STA) is in a moving state with a relatively large speed, the channel condition therebetween may vary dramatically;

4) Optionally, moving speed of environmental objects in the channel: if there are moving objects in the channel between the communication entities, channel condition may be impacted, the moving speed may be estimated by Matrix Pencil algorithm, etc.

For example, for the first time instant T1, only one CSI $CSI_{T1}$ is obtained, and the interval between different subcarriers is usually an integer multiple of $\Delta_f$ or $\Delta_f$. At this time, the spatial parameter vector $V_{T1} = \{\alpha_{AOD}, \alpha_{AoA}, d, v, \ldots\}$ may be at least derived from the $CSI_{T1}$, where $\alpha_{AOD}$ and $\alpha_{AoA}$ are the departure angle (transmission angle) and arrival angle, d is the average distance between any pair of transmit antenna Tx and receive antenna Rx, and v is the average speed of any receive antenna Rx relative to any transmit antenna Tx (e.g., the v may be the speed of the STA relative to the AP). In some cases, the $V_T$, may also include the information of distance for each pair of transmit antenna Tx and receive antenna Rx.

For the $\alpha_{AOD}$ and $\alpha_{AoA}$ estimation, if the antennas are arranged as a linear array, $\alpha_{DOA}$ and $\alpha_{AoA}$ can be calculated by performing the Multiple Signal Classification (MUSIC) algorithm on the $CSI_{T1}$. If the antennas are not arranged as the linear array, the Tx-Rx angles ($\alpha_{DOA}$ and $\alpha_{AoA}$) may be calculated by the time delay (corresponding to the phase difference, which may be derived from the $CSI_{T1}$), RSSI, and/or antenna spacings, for different RX antennas. The antenna spacings can be calculated by RSSI, or by ToF, and the calculation accuracy can be improved by considering the phase difference.

If the STA is moving relative to the AP, the Doppler frequency shift is non-zero. If the STA is not moving relative to the AP, the Doppler frequency shift can be ignored. For the speed estimation, it is difficult to judge whether the communication entity, for example the STA, is moving according to the only one $CSI_{T1}$. Therefore, continuous multiple CSI measurements (samples) may be used to judge whether there is Doppler frequency shift in combination with phase change derived from the CSI samples. However, apart from CSI, the communication entity (e.g., the AP or the STA) may judge whether it is moving relative to the other communication entity and the moving direction and/or speed through sensors such as gyroscopes installed thereon.

In addition, for the (compressed) CSI for other time instants, similar process for determining the spatial parameter information is performed. Further, parameters included in this spatial parameter vector are just for example, and other spatial parameters which may be related to or reflect the channel condition may be included in the spatial parameter vector, and/or some of the above illustrated parameters may be excluded in the spatial parameter vector. Parameters included in this spatial parameter vector may be obtained in any known manner.

For the prediction process for the CSI, for example, when $CSI_{Tm}$ and $V_{Tm}$ are obtained, if it is determined that there is no relative movement or the relative moving speed is slow between two communication entities (e.g., the STA and the AP), for example, according to the determined spatial parameter vector, so that the coherence time Tc>t, it can be considered that the channel has not changed, that is, the predicted $\widetilde{CS} I_{T(m+1)} = CSI_{Tm}$ (T(m+1)=Tm+t). The coherence time Tc=$\lambda$/2v, $\lambda$ is the speed of light and the v is the relative moving speed. t is the time interval of two adjacent CSI feedbacks or two NDP frames. If the relative movement is detected and the coherence time Tc is less than t (the relative moving speed is high), the spatial position and relative moving speed of one communication entity (e.g., the STA) relative to the other communication entity (e.g., the AP) after time interval t may be predicted according to the angle, distance and speed information in the spatial parameter vector $V_{Tm}$, and then the time delay (related to the phase difference), Doppler frequency offset and amplitude change for each Tx-Rx antenna pair on each subcarrier at time instant T(m+1) can be calculated, and each channel response element (e.g., each matrix element in the CSI matrix) of the $CSI_{Tm}$ can be adjusted, as the predicted CSI $\widetilde{CS} I_{T(m+1)}$ for the next time instant T2.

Optionally, in some cases, the historical data may also be used for CSI prediction. For example, multiple pieces of historical (determined or predicted) CSI data of previous multiple time instants are obtained, and used to predict the CSI $\widetilde{CS} I_{T(m+1)}$ for the next time instant T(m+1), e.g., using the channel estimation algorithms MMSE, ML, Matrix pencil or proxy algorithms.

The details of the MMSE, ML, Matrix Pencil or Prony algorithms are the same as the existed technology of the technical field, which are omitted here.

In addition, the spatial parameter information may be used for assisting in the compression level selection. For example, the compression level for the third measured CSI for the third time instant T3 is further determined based on the spatial parameter information for the second time instant, in addition to the comparison between the first predicted CSI and the second measured CSI.

Optionally, the step of determining the compression level for the third measured CSI may include: determining a group of compression levels based on the comparison between the first predicted CSI and the second measured CSI; selecting the compression level for the third measured CSI from the group of compression levels based on the spatial parameter information for the second time instant. That is, the compression level selection is mainly related to the CSI comparison, and the spatial parameter information realizes a finer compression level selection.

Similarly, the spatial parameter information may be predicted, to assist to evaluate the prediction accuracy together with the CSI prediction. Thus, the method 200 may further include the step: predicting predicted spatial parameter information for the second time instant based at least on the spatial parameter information for the first time instant. Then, the compression level selection may be further based on the spatial parameter information for the second time instant, or based on a comparison between the spatial parameter information for the second time instant and the predicted spatial parameter information for the second time instant. For example, the method 200 may further include the step: determining spatial parameter information for the second time instant based at least on the second measured CSI for the second time instant.

For example, a first group of 3 compression levels are determined at first based on the CSI comparison, and when the spatial parameter information for the second time instant indicates that the speed of the STA is high, or the comparison related to the spatial parameter information for the second time instant indicating that the speed error of the STA is high, then the final compression level should be chosen as the minimum one in the group.

For example, the prediction of the spatial parameter information for a next time instant may be obtained by using the MMSE (minimum mean square error), ML (maximum likelihood), Matrix pencil or Prony algorithms on the spatial parameter matrix for the current time instant and/or other historical (determined or predicted) spatial parameter information. Or, in other examples, the prediction may be performed based on the spatial geometry, for example, the relative location (distance), speed, angle, etc. in the spatial parameter information for current time instant may be used to predict the spatial parameter information for the next time instant (assuming that the speed does not change). In other examples, after the predicted CSI for the next time instant is obtained, the spatial parameter information for the next time instant may be obtained based at least on the predicted CSI for the next time instant similarly as the determination of the spatial parameter information for current first time instant mentioned above.

Considering that the spatial parameter information may be of multiple dimensions, e.g., the angle, the time delay (the distance), the speed, etc., the comparison related to the spatial parameter information may be performed for each dimension, i.e., each type of spatial parameter, to obtain multiple errors (e.g., NMSE or MSE) for the multiple dimensions. The final comparison result for the spatial parameter information may be the error for a predetermined dimension, or an average normalized error for all the dimensions, or the smallest error for all the dimensions, etc.

Optionally, the determined spatial parameter information may also be used to assist to determine the compression manner, or the predicted spatial parameter information may also be compared with the corresponding determined spatial parameter information, to assist to determine the compression manner.

In an example, the compression manner for the compression level for the third measured CSI for the third time instant T3 may be determined based on the determined spatial parameter information for the second time instant or based on a comparison of the determined spatial parameter information for the second time instant and the predicted spatial parameter information for the second time instant.

In the embodiments, the compression level may correspond to one or any combination of: a time interval between time instants for CSI feedbacks; a frequency bandwidth covered by a single CSI feedback; a number of subcarriers covered by a single CSI feedback; or a dimension of the antennas covered by a single CSI feedback, which may form different candidate compression manners for the determined compression level.

Therefore, after the compression level is determined or each time the compression level is adjusted, at least one of the following adjustment operations may be chosen as the compression manner and performed (with or without considering the spatial parameter information):

1) Adjusting the time interval between time instants for CSI feedbacks (e.g., between time instants for transmitting the reference signal or the detection frame or transmitting the feedback CSI);
2) Adjusting the frequency bandwidth covered by a single CSI feedback;
3) Adjusting the number of subcarriers covered by a single CSI feedback; or
4) Adjusting the dimension of the antennas covered by a single CSI feedback.

For example, for the operation 1), by reducing the frequency of CSI detection or CSI feedback (because the time interval between time instants for CSI feedbacks is reduced), the channel occupation, storage overhead and transmission resources are reduced from the time dimension. The higher the compression level, the greater the value of the time interval. Optionally, the correspondence of compression levels and the values of the time interval may be preset. In this case, during the period between two adjacent CSI feedbacks, the AP may use the latest CSI feedback if the AP requires the CSI feedback but no new CSI feedback is obtained due to the reduction of the frequency of CSI detection or CSI feedback.

For example, for operation 2), by reducing the scale of a single CSI feedback, the channel occupation is reduced from the frequency dimension, which may also reduce the computational overhead of CSI estimation and/or transmission resources. The higher the compression level, the smaller the value of the detection bandwidth (targeted bandwidth of a single CSI). Optionally, the correspondence of compression levels and the values and/positions of the detection bandwidth may be preset or negotiated/communicated between the communication entities. The reduction of the frequency bandwidth leads to the reduction of some consecutive subcarriers, thereby reducing the amount of feedback data, i.e., the dimension, scale or the size of the CSI feedback.

For example, for operation 3), because a CSI of full size includes the channel responses of all subcarriers in the targeted bandwidth, by reducing the number of subcarriers related to a single CSI, information on CSI for only a part of subcarriers may be selected for feedback, thus reducing the amount of feedback data, i.e., the dimension, scale or the size of the CSI feedback. The higher the compression level, the smaller of the value of the number of the selected subcarriers. Optionally, the correspondence of compression levels and the values of number of the selected subcarriers may be preset. In addition, optionally, the information on selected subcarriers may be negotiated/communicated between the communication entities, for example, the identification information (e.g., index) of each selected subcarrier may be transmitted together with the CSI feedback or the compression level. Or, in other examples, the selected subcarriers for each compression level is preset, if the AP knows the compression level, it may determine which subcarriers are selected.

For example, for operation 4), because a CSI with full size includes all the transmitting and receiving antennas, by reducing the antenna dimension related to a single CSI, information on CSI for only a part of the transmitting and receiving antennas may be selected for feedback, thus reducing the amount of feedback data i.e., the dimension, scale or the size of the CSI. The higher the compression level, the smaller of the value of the number of the selected antennas. Optionally, the correspondence of compression levels and the values of number of the selected antennas may be preset. In addition, optionally, information on the selected antennas may be negotiated/communicated between the communication entities, for example, the identification information (e.g., index) of each selected antenna may be transmitted together with the CSI feedback or the compression level. Or, in other example, the selected antennas for each compression level is preset, if the AP knows the compression level, it may determine which antennas are selected.

In addition, after determining the compression level for the third measured CSI based on the comparison between the first predicted CSI and the second measured CSI, one or more of the following may be adjusted: the time interval between time instants for CSI feedbacks, the frequency bandwidth covered by a single CSI feedback, the number of subcarriers covered by a single CSI feedback, or the dimension of the antennas covered by a single CSI feedback, based on the spatial parameter information for the second time instant or based on the comparison between the spatial parameter information for the second time instant and the predicted spatial parameter information for the second time instant.

In some examples, the compression manner corresponding to the determined compression level may be determined based on the spatial parameter information and may include two or more adjustment operations for better compression effect and accuracy.

For example, in a case where the CSI prediction error is large and thus the compression level is firstly determined, when the comparison result related to the spatial parameter information indicates that the prediction error for the speed dimension is large, the compression manner corresponds to the determined compression level may include decreasing the time interval between time instants for CSI feedbacks (e.g., by increasing the NDP frequency). For example, even if the compression level is determined to be in a relatively small level, when the comparison result of the spatial parameter information indicates that the prediction error for the speed dimension is large, the corresponding compression manner may include one or more of: decreasing the time interval between time instants for CSI feedbacks (e.g., by increasing the NDP frequency), and keeping or decreasing the frequency bandwidth covered by a single CSI feedback, keeping or decreasing the number of subcarriers covered by a single CSI feedback, or keeping or decreasing the dimension of the antennas covered by a single CSI feedback. The increase or decrease for each of: the time interval between time instants for CSI feedbacks, the frequency bandwidth covered by a single CSI feedback, the number of subcarriers covered by a single CSI feedback, or the dimension of the antennas covered by a single CSI feedback may be relative to a reference value, respectively, e.g., respective values when no CSI compression is made or previous values.

In some examples, for the speed dimension, if the speed of the spatial parameter information for the second time instant exceeds a certain threshold, it is better to decrease or keep the time interval between time instants for CSI feedbacks (e.g., by increasing the NDP frequency) for a certain determined compression level; and if the speed is lower than the certain threshold, it is better to increase or keep the time interval between time instants for CSI feedbacks. In some cases, the NDP detection frequency needs to be constrained by the speed, e.g., NDP detection frequency needs to be not less than 1/e, where Tc=λ/2v is coherence time, λ is wavelength, and v is the speed.

For the angle dimension and the time delay dimension, if the change from the value at current time instant relative to the previous value at the previous time instant (e.g., T1) is violent and the speed is slow, the multipath effect in the environment may be serious, thus it is better to increase or keep the number of subcarriers for a certain determined compression level. Or, in a specific angle area (for example, two linear arrays of the two communication entities are on the same straight line), and the time delay (representing the distance) is greater than a certain threshold, it is considered that multipath effect has a great influence, thus it is better to increase or keep the number of subcarriers for a certain determined compression level.

For the time delay (or distance) dimension, if the time delay (or distance) is less than a certain threshold, the internal antenna spacing of antennas Tx or Rx cannot be ignored compared with the distance of Tx-Rx, and the channel model tends to the near-field model, that is, the signal transmission cannot be approximated as a plane wave but a spherical wave. In this scenario, it is better to increase or keep the dimension of the antennas for a certain determined compression level.

It should be noted that, for the predication operations of CSI and/or the spatial parameter information, the AP and the STA can adopt the same prediction manner, so if they obtain the same data, the prediction result of one of the AP and the STA may be the same and known to the other one of the AP and the STA. In addition, in other examples, even though the CSI prediction, the estimation and prediction of spatial parameter information, or the determination of the compression level may be performed at one or more of the AP, the STA, or the controller as mentioned above, the entity which is designed or selected to determine the compression level may be identical with the entity which is designed or selected to perform the CSI prediction. The selection of entities that perform respective operations (e.g., the CSI prediction, the estimation and prediction of spatial parameter information, or the determination of the compression level) may be based on minimizing the possibility of transmitting CSIs of full size without compression.

As described, the compression may be related to reduction of CSI information related to the reduced number of subcarriers and/or antennas in a single CSI feedback. That is, each compressed CSI (e.g., the third measured CSI) is associated with a subset of antennas and/or subcarriers from a set of antennas and/or subcarriers associated with the first predicted CSI. When determining the difference between a compressed CSI and a predicted CSI for the same time instant, the intersection of 1) antennas and/or subcarriers associated with the compressed CSI and 2) antennas and/or subcarriers associated with the predicted CSI for the same time instant is determined, and then the difference is calculated for the intersection.

Optionally, because the compression may be related to reduction of CSI information on the reduced number of subcarriers and/or antennas in a single CSI feedback, therefore, the method shown in FIG. 2 may include a recovery step if the compressed CSI is acquired at the AP (e.g., received from the STA or a controller). The recovery step is performed at the AP. The recovery step is not always necessary at the AP side, according to the specific application scenarios, and in some application scenarios, the compressed CSI is enough to be used directly by the AP.

Optionally, the second CSI for the second time instant T2 is a compressed CSI, and as shown in step S240 of FIG. 2, a recovered CSI without compression for the third measured CSI is determined, based on at least one of the second predicted CSI and the third measured CSI.

As stated above, when the STA or the controller transmits the compressed CSI to the AP, the recovery is performed at the AP.

When preforming the recovery from the third measured CSI (a compressed CSI), the difference between the second predicted CSI and the third measured CSI (a compressed CSI) is determined with respect to the subset of antennas and/or subcarriers, and correction values are determined based on the difference. Then, feedback values for the remaining antennas and/or subcarriers in the set of antennas and/or subcarriers except for the subset of antennas and/or subcarriers in the second predicted CSI are determined based on the correction values and using an interpolation algorithm (based on the (compressed) third measured CSI). A combination of the feedback values for the remaining antennas and/or subcarriers and feedback values in the third measured CSI is taken as the recovered CSI without compression of the third measured CSI. For example, using the difference in terms of amplitude and phase with respect to the subset of antennas and/or subcarriers, combining the velocity in the spatial parameter information ($V_{T3}$) to calculate the Doppler frequency offset difference, and combining the angular delay in the spatial parameter information to calculate the attenuation and phase difference, the correction values of amplitude and phase may be comprehensively calculated. The feedback values in the third measured CSI replace the predicted values corresponding to the subset of antennas and/or subcarriers, and feedback values for the remaining antennas and/or subcarriers in the set of antennas and/or subcarriers except for the subset of antennas and/or subcarriers in the second predicted CSI are determined using interpolation method combined with the correction values of amplitude and phase.

In other examples, when preforming the recovery from the third measured CSI (a compressed CSI), feedback values for the remaining antennas and/or subcarriers in the set of antennas and/or subcarriers except for the subset of antennas and/or subcarriers are determined by using an interpolation algorithm, based on the third measured CSI; and the determined feedback values for the remaining antennas and/or subcarriers and feedback values in the third measured CSI are combined, as the recovered CSI without compression for the third measured CSI.

As mentioned above, in a case where the AP receives the feedback CSI from the STA, the CSI estimation may be performed at the STA, and the CSI predication, spatial parameter information prediction and/or estimation and the compression level selection and/or adjustment may be performed at the STA, AP, or the controller.

The communication apparatus is an access point (AP) connected with a station (STA), the AP transmits information indicating the compression level to the STA. Alternatively, the communication apparatus is a STA connected with an AP, the STA transmits information indicating the compression level to the AP. Alternatively, the communication apparatus is a controller connected with an AP and STA, the controller transmits information indicating the compression level to the AP and the STA.

For example, after the AP determines the compression level to be used for compressing at the STA the CSI for the time instant Tm, the AP may carry this indication information of the compression level in the detection frame (NDP frame) or other frames at the time instant Tm to inform the STA of the selected compression level in advance; or after the STA determines the compression level to be used for compressing the CSI for the time instant Tm, it feeds back the compressed CSI along with this indication information of the compression level.

Therefore, according to the method described with reference to the FIG. 2 of present application, a compression level may be selected according to the real-time CSI prediction, thus the overhead of the transmission may be reduced and at the same time the compressed CSI is suitable for current channel condition. In addition, the spatial parameter information (such as angle, time delay and speed) is introduced for assisting the CSI predication and compression level determination, therefore, the compression level is more appropriate, and thus the accuracy of the recovered CSI from the compressed CSI may be improved. In addition, the compression method may include various adjustment manners for the compression level, that is, it may not only adjust the number of subcarriers and/or the antennas which the single CSI feedback covers, but also adjusts the detection interval or feedback interval and/or adjusts the bandwidth which the CSI feedback covers, which results in the flexible and optimal selection for the compression level under different channel conditions. Further, this solution of present disclosure has high feasibility and good compatibility with the current communication mechanism.

Figure 3:
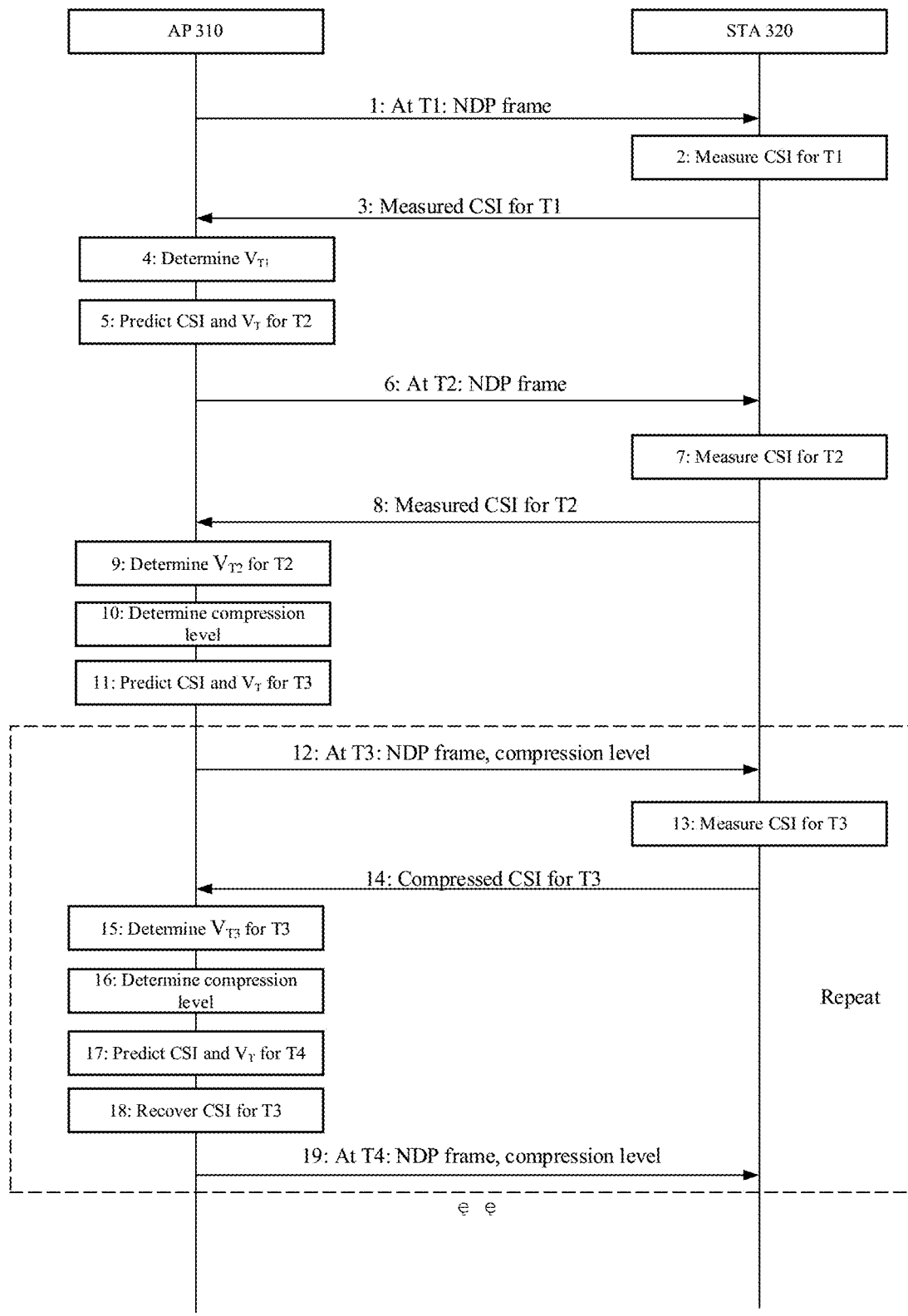
FIG. 3 schematically illustrates a process flow between the AP and the STA for a specific application scenario according to an embodiment of present disclosure.

FIG. 3 illustrate a process flow between the AP 310 and the STA 320 for a specific application scenario based on the method of FIG. 2. In this application scenario, as an example, the AP receives the CSI feedback from the STA, the CSI estimation or measurement may be performed at the STA, the CSI predication, spatial parameter information prediction and/or estimation as well as the compression level selection and/or adjustment may be performed at the AP, and the AP recovers the CSI from the compressed CSI.

As shown in FIG. 3, the AP may be the AP shown in the FIG. 1 and the STA may be the STA shown in the FIG. 1.

In the process 1, at time instant T1, the AP sends an NDP frame to the STA, and in the process 2, the STA estimates or measures the corresponding CSI and in the process 3 feeds it back to the AP completely, and this measured CSI is recorded as $CSI_{T1}$.

In the process 4, the AP determines the spatial parameter vector $V_{T1}$ (spatial parameter information) after receiving the $CSI_{T1}$ fed back by STA. The spatial parameters in the vector may include but are not limited to the required physical parameters such as angle, time delay and speed.

In the process 5, the AP predicts the spatial parameter vectors $\hat{V}_{T2}$ and $\widetilde{CS}\,I_{T2}$ for the next detection time instant T2=T1+t, based on the measured $CSI_{T1}$ and the determined spatial parameter vector $V_{T1}$, e.g., using the MMSE, ML and/or Prony and optionally in combination with the channel model and spatial model.

In the process 6, at time instant T2, the AP sends an NDP frame to the STA, and in the process 7, the STA estimates or measures the corresponding CSI and in the process 8 feeds it back to the AP completely, and this measured CSI is recorded as $CSI_{T2}$.

In the process 9, the AP determines the spatial parameter vector $V_{T1}$ (spatial parameter information) after receiving the $CSI_{T1}$ fed back by STA.

In the process 10, the AP evaluates the predicted state (e.g., predication accuracy) for the time instant T2 by combining the predicted spatial parameter vectors $\hat{V}_{T2}$ and $\widetilde{CS}\,I_{T2}$ with the measured $CSI_{T2}$ and the determined spatial parameter vector $V_{T2}$, and based on the predicted state, determines the compression level for the CSI for the next time instant T3.

In the process 11, the AP also predicts the spatial parameter vectors $V_{T3}$ and $\widetilde{CS}\,I_{T3}$ for the next detection time instant T3, based on the measured $CSI_{T2}$ and the determined spatial parameter vector $V_{T2}$ and optionally the historical CSI and spatial parameter vectors.

In the process 12, at time instant T3, the AP sends an NDP frame and the indication of the determined compression level (the indication may be carried in the NDP frame or independently transmitted) to the STA, and in the process 13, the STA estimates or measures the corresponding CSI and compresses the CSI based on current compression level, and in the process 14 feeds the compressed CSI for the time instant T3 back to the AP.

In the processes 15-17, the operations are similar to the operations of processes 9-11, therefore, the details are omitted here.

In the process 18, because the received CSI for T3 is compressed, the AP recovers the compressed CSI $\widetilde{CS}\,I_{T3}$ for the T3 based on the compressed CSI $\widetilde{CS}\,I_{T3}$. Details of recovery step are described before and are omitted here.

In the process 19, at time instant T4, the AP sends an NDP frame and the indication of the determined (adjusted) compression level (the indication may be carried in the NDP frame or independently transmitted) to the STA, and continuously performs the operations similar to the operations of processes 12-18, that is, the operations of processes 12-18 may be repeated.

Figure 4:
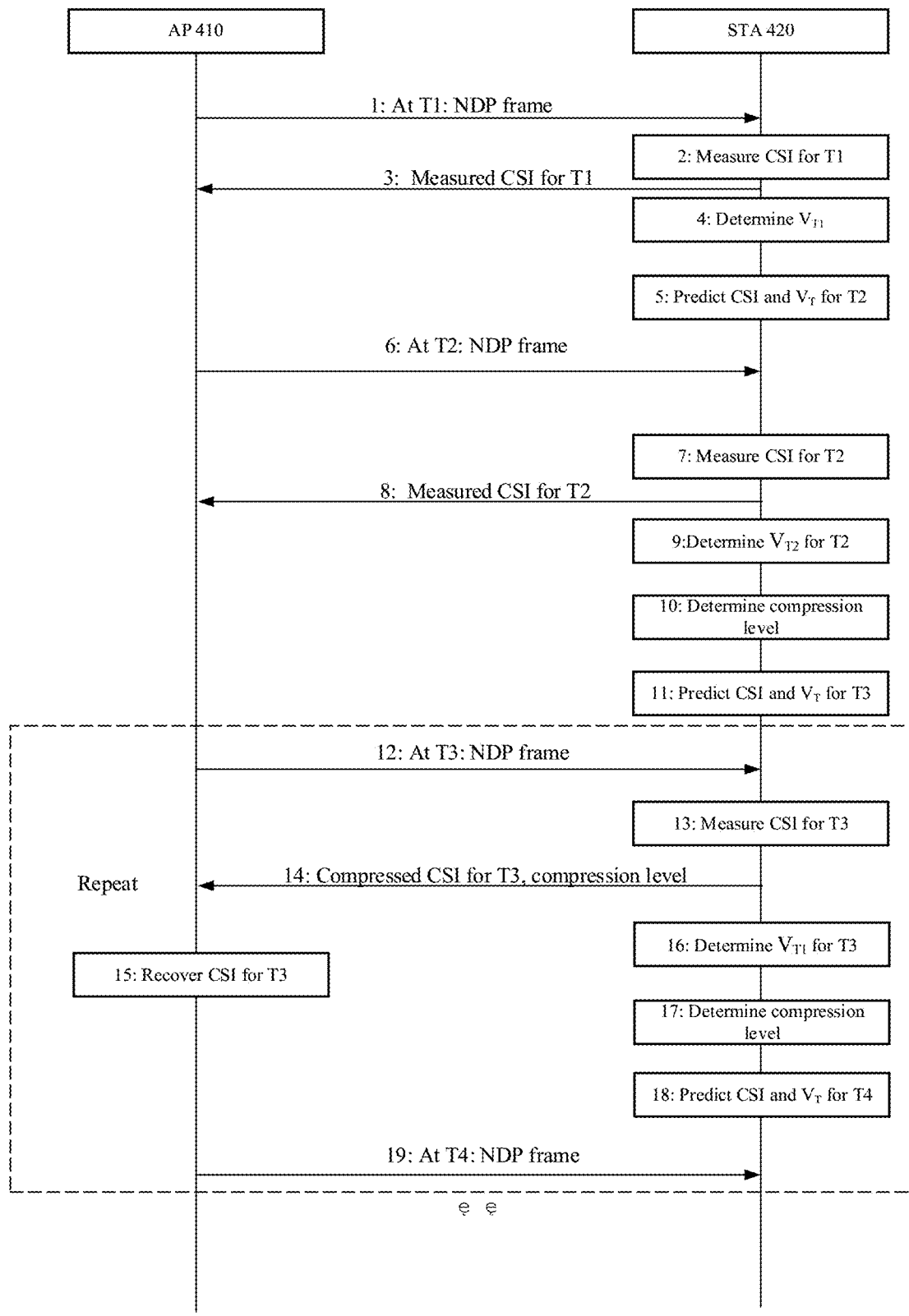
FIG. 4 schematically illustrates a process flow between the AP and the STA for another specific application scenario according to an embodiment of present disclosure.

FIG. 4 illustrate a process flow between the AP 410 and the STA 420 for a specific application scenario based on the method of FIG. 2. In this application scenario, as an example, the CSI predication, spatial parameter information prediction and/or determination as well as the compression level selection and/or adjustment may be performed at the STA, and the AP receives the compressed CSI and recovers the complete CSI.

As shown in FIG. 4, the AP may be the AP shown in the FIG. 1 and the STA may be the STA shown in the FIG. 1.

In the process 1, at time instant T1, the AP sends an NDP frame to the STA, and in the process 2, the STA estimates or measures the corresponding CSI and in the process 3 feeds it back to the AP completely, and this measured CSI is recorded as $CSI_{T1}$.

In the process 4, the STA determines the spatial parameter vector $V_{T1}$ (spatial parameter information) after measuring the $CSI_{T1}$ at the STA. The spatial parameters in the vector may include but are not limited to the required physical parameters such as angle, time delay and speed.

In the process 5, the STA predicts the spatial parameter vectors $\hat{V}_{T2}$ and $\widetilde{CS}\ I_{T2}$ for the next detection time instant T2=T1+t, based on the measured $CSI_{T1}$ and the determined spatial parameter vector $V_{T1}$, e.g., using the MMSE, ML and/or Prony and optionally in combination with the channel model and spatial model.

In the process 6, at time instant T2, the AP sends an NDP frame to the STA, and in the process 7, the STA estimates or measures the corresponding CSI and in the process 8 feeds it back to the AP completely.

In the process 9, the STA determines the spatial parameter vector $V_{T2}$ (spatial parameter information) after measuring the $CSI_{T2}$ at the STA.

In the process 10, the STA evaluates the predicted state (e.g., predication accuracy) for the time instant T2 by combining the predicted spatial parameter vectors $\hat{V}_{T2}$ and $\widetilde{CS}\ I_{T2}$ with the measured $CSI_{T2}$ and the determined spatial parameter vector $V_{T2}$, and based on the predicted state, determines the compression level for the CSI for the next time instant T3.

In the process 11, the STA also predicts the spatial parameter vectors $\hat{V}_{T3}$ and $\widetilde{CS}\ I_{T3}$ for the next detection time instant T3, based on the measured $CSI_{T3}$ and the determined spatial parameter vector $V_{T3}$ and optionally the historical CSI and spatial parameter vectors.

In the process 12, at time instant T3, the AP sends an NDP frame and the indication of the determined compression level (they may be formed together) to the STA, and in the process 13, the STA estimates or measures the corresponding CSI and compresses the CSI based on current compression level, and in the process 14 feeds the compressed CSI for the time instant T3 back to the AP. In addition, in the process 14, the STA also transmits the indication of the compression level to the STA, which may be carried in the compressed CSI or independently transmitted.

In the process 15, because the received CSI for T3 is compressed, the AP recovers the compressed CSI $\widetilde{CS}\ I_{T3}$ for the T3 based on the compressed CSI $\widetilde{CS}\ I_{T3}$. In this case, because the CSI prediction is not performed at the AP, the recovery step may be based on the linear interpolation algorithm without using the predicted CSI. Details of recovery step are described before and are omitted here.

In the processes 16-18, the operations are similar to the operations of processes 9-11, therefore, the details are omitted here.

In the process 19, at time instant T4, the AP sends an NDP frame to the STA, and continuously performs the operations similar to the operations of processes 12-18, that is, the operations of processes 12-18 may be repeated.

It should be noted that, the order of the processes illustrated in the FIG. 3 and FIG. 4 is not fixed, two or more processes may be performed simultaneously or in a reverse order. For example, in FIG. 4, the process 15 of recovering CSI at the AP may be performed in parallel with the operations 16-17 at the STA; the process 14 and process 16 may be performed in a reverse order, etc.

In addition, FIG. 3 and FIG. 4 illustrate the communication between the AP and the STA, however, as mentioned above, in addition to the STA and the AP, there may be a controller for performing one or more of processes illustrated in FIG. 3 and FIG. 4.

According to another aspect of present disclosure, a communication apparatus for channel state information (CSI) feedback is provided.

Figure 5:
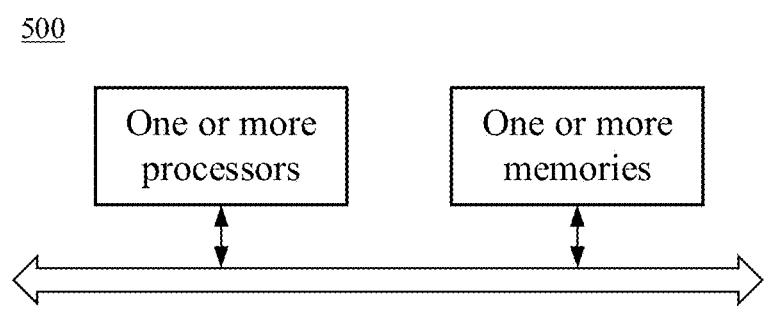
FIG. 5 schematically illustrates a structural block of a communication apparatus for channel state information (CSI) feedback according to an embodiment of present disclosure.

FIG. 5 schematically shows a structure block of a communication apparatus for channel state information (CSI) feedback according to an embodiment of present application. The apparatus may be any one of the AP shown in FIG. 1, AP 310 in FIG. 3 and AP 410 in FIG. 4. The communication apparatus may be any one of any one of the STA shown in FIG. 1, STA 320 in FIG. 3 and STA 420 in FIG. 4.

As shown in FIG. 5, a communication apparatus 500 includes one or more processors, and one or more memories. The one or more processors and the one or more memories are coupled with each other.

The one or more memories comprises a nonvolatile storage medium and/or an intrinsic memory. The nonvolatile storage medium stores an operating system and computer executable programs, which, when executed by the one or more processors, can enable the processor to perform various operations.

The one or more processors are caused to: predict a first predicted CSI for a second time instant T2 based at least on a first measured CSI for a first time instant T1; obtain a second measured CSI for the second time instant T2; and determine a compression level for a third measured CSI for a third time instant T3 after the second time instant T2 based at least on comparison between the first predicted CSI and the second measured CSI.

In an embodiment, the computer program is executed to cause the one or more processors to: predict a second predicted CSI for the third time instant T3 based at least on the second measured CSI for the second time instant T2; obtain the third measured CSI for the third time instant T3, the third measured CSI being compressed based on the compression level; and adjust the compression level based on comparison between the second predicted CSI and the third measured CSI.

In addition, the spatial parameter information may also be introduced for assistance for predicting the CSI and evaluating the channel stability, so that the compression level may be further determined based on the spatial parameter information.

Optionally, the communication apparatus is an access point device, and the computer program is executed to cause the one or more processors to: determine a recovered CSI without compression of the third measured CSI, based on at least one of the second predicted CSI and the third measured CSI.

Optionally, the communication apparatus is a station device, and the computer program is executed to cause the one or more processors to: measure the first measured CSI for the first time instant T1. The third measured CSI is a CSI compressed at the station device according to the compression level.

More details of the operations at the AP device are described with reference to the FIGS. 1-4, and are omitted here.

The processor(s) can be an integrated circuit chip with signal processing capability. The processor can be a general processor, a digital signal processor (DSP), an application specific integrated circuit (ASIC), an off-the-shelf programmable gate array (FPGA) or other programmable logic devices, discrete gate or transistor logic devices, and discrete hardware components, for implementing or executing the methods, steps and logic blocks or the operations disclosed in the embodiments of the present application. The general processor can be a microprocessor or any conventional processor, and it can be X84 architecture or ARM architecture.

The nonvolatile storage medium(media) may be read-only memory (ROM), programmable read-only memory (PROM), erasable programmable read-only memory (EPROM), electrically erasable programmable read-only memory (EEPROM) or flash memory. It should be noted that the memories of the methods described in present application are intended to include, but are not limited to, these and any other suitable types of memories.

According to another aspect of present application, a computer-readable storage medium is also provided, on which computer programs are stored, and when the computer programs are executed by a processor, the processor is caused to perform the steps of the method for channel state information (CSI) feedback at the AP or the STA or the controller described with reference to FIGS. 2-4.

According to another aspect of the present application, there is also provided a communication system. The communication system may be the communication system shown in FIG. 1, and the AP, the STA and/or the controller in the communication system may perform the method for channel state information (CSI) feedback described with reference to the FIGS. 2-4.

According to another aspect of the present application, there is also provided a computer program product, including computer programs, which, when executed by a processor, realizes the steps of the method for channel state information (CSI) feedback at the AP or the STA or the controller described with reference to FIGS. 2-4.

Reference to an element in the singular is not intended to mean "one and only one" unless specifically so stated, but rather "one or more." Similarly, reference to an element in the plural is not intended to mean "more than one" unless specifically so stated or being contradictory with the description elsewhere, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

It should be noted that the flowcharts and block diagrams in the attached drawings illustrate the possible architectures, functions and operations of the methods and apparatuses according to various embodiments of the present application. In this regard, each block in the flowchart or block diagram may represent a module, a program segment, or a part of code, which contains at least one executable instruction for implementing a specified logical function. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The example embodiments of the present application described in detail above are only illustrative and not restrictive. It should be understood by those skilled in the art that various modifications and combinations can be made to these embodiments or their features without departing from the principles and spirit of present application, and such modifications should fall within the scope of present application.

What is claimed is:

1. A method for channel state information (CSI) feedback implemented in a communication apparatus, comprising:
predicting a first predicted CSI for a second time instant based at least on a first measured CSI for a first time instant;
obtaining a second measured CSI for the second time instant; and
determining a compression level for a third measured CSI for a third time instant after the second time instant based at least on comparison between the first predicted CSI and the second measured CSI,
wherein determining the compression level for the third measured CSI, comprises:
determining a group of compression levels based on the comparison between the first predicted CSI and the second measured CSI; and
selecting the compression level for the third measured CSI from the group of compression levels based on spatial parameter information for the second time instant.

2. The method according to claim 1, further comprising:
predicting a second predicted CSI for the third time instant based at least on the second measured CSI for the second time instant;
obtaining the third measured CSI for the third time instant, the third measured CSI being compressed based on the compression level; and adjusting the compression level based on comparison between the second predicted CSI and the third measured CSI, the adjusted compression level being used for compressing a measured CSI following the third measured CSI.

3. The method according to claim 1, further comprising:
determining spatial parameter information for the first time instant based at least on the first measured CSI for the first time instant;
wherein, the first predicted CSI for the second time instant is predicted further based on the determined spatial parameter information for the first time instant.

4. The method of claim 1, further comprising:
determining the spatial parameter information for the second time instant based at least on the second measured CSI for the second time instant;
wherein, the compression level for the third measured CSI is determined further based on the spatial parameter information for the second time instant.

5. The method of claim 1, further comprising:
predicting predicted spatial parameter information for the second time instant based at least on spatial parameter information for the first time instant; and
wherein selecting the compression level for the third measured CSI, comprises:
selecting the compression level for the third measured CSI from the group of compression levels based on a comparison between the spatial parameter information for the second time instant and the predicted spatial parameter information for the second time instant.

6. The method according to claim 1, further comprising:
determining the spatial parameter information for the second time instant based at least on the second measured CSI for the second time instant; and
determining a compression manner for the determined compression level, based at least on the spatial parameter information for the second time instant.

7. The method of claim 1, wherein a compression manner for the determined compression level includes one of or any combination of:
adjusting a time interval between time instants for CSI feedbacks;
adjusting a frequency bandwidth covered by a single CSI feedback;
adjusting a number of subcarriers covered by a single CSI feedback; or
adjusting a dimension of the antennas covered by a single CSI feedback.

8. The method according to claim 1, wherein,
the communication apparatus is an access point (AP) connected with a station (STA), the AP transmits information indicating the compression level to the STA;
the communication apparatus is a STA connected with an AP, the STA transmits information indicating the compression level to the AP; or
the communication apparatus is a controller connected with an AP and STA, the controller transmits information indicating the compression level to the AP and the STA.

9. The method of claim 2, wherein the communication apparatus is an access point (AP), and the method further comprises:
determining a recovered CSI without compression for the third measured CSI based on at least one of the second predicted CSI and the third measured CSI.

10. The method according to claim 6, wherein, determining a compression manner for the determined compression level, based at least on the spatial parameter information for the second time instant, comprises:
predicting predicted spatial parameter information for the second time instant further based on spatial parameter information for the first time instant; and
determining the compression manner for the determined compression level, based on the spatial parameter information for the second time instant or based on the comparison between the spatial parameter information for the second time instant and the predicted spatial parameter information for the second time instant.

11. The method of claim 9, wherein the third measured CSI is associated with a subset of antennas and/or subcarriers from a set of antennas and/or subcarriers associated with the first predicted CSI; and
wherein determining a recovered CSI without compression for the third measured CSI based on at least one of the second predicted CSI and the third measured CSI, comprises:
determining a difference between the second predicted CSI and the third measured CSI with respect to the subset of antennas and/or subcarriers;
determining correction values based on the difference;
determining feedback values for the remaining antennas and/or subcarriers in the set of antennas and/or subcarriers except for the subset of antennas and/or subcarriers in the second predicted CSI based on the correction values and using an interpolation algorithm; and
combining the feedback values for the remaining antennas and/or subcarriers and feedback values in the third measured CSI as the recovered CSI without compression for the third measured CSI.

12. The method of claim 9, wherein the third measured CSI is associated with a subset of antennas and/or subcarriers from a set of antennas and/or subcarriers associated with the first predicted CSI;
wherein determining a recovered CSI without compression for the third measured CSI based on at least one of the second predicted CSI and the third measured CSI, comprises:
determining feedback values for the remaining antennas and/or subcarriers in the set of antennas and/or subcarriers except for the subset of antennas and/or subcarriers by using an interpolation algorithm, based on the third measured CSI; and
combining the feedback values for the remaining antennas and/or subcarriers and feedback values in the third measured CSI, as the recovered CSI without compression for the third measured CSI.

13. The communication apparatus of claim 12, wherein, the communication apparatus is a station device, and the computer program is further executed to cause the one or more processors to: measure the first measured CSI for the first time instant, and wherein, the third measured CSI is a CSI compressed at the station device according to the compression level.

14. A communication apparatus for channel state information (CSI) feedback, comprising:
one or more processors; and
one or more memories having stored thereon a computer program which, when executed by the one or more processors, causes the one or more processors to:

predict a first predicted CSI for a second time instant based at least on a first measured CSI for a first time instant;
obtain a second measured CSI for the second time instant; and
determine a compression level for a third measured CSI for a third time instant after the second time instant based at least on comparison between the first predicted CSI and the second measured CSI,
wherein to determine the compression level for the third measured CSI, the one or more processors are caused to:
determine a group of compression levels based on the comparison between the first predicted CSI and the second measured CSI; and
select the compression level for the third measured CSI from the group of compression levels based on spatial parameter information for the second time instant.

15. The communication apparatus of claim 14, wherein, the computer program is further executed to cause the one or more processors to:
predict a second predicted CSI for the third time instant based at least on the second measured CSI for the second time instant;
obtain the third measured CSI for the third time instant, the third measured CSI being compressed based on the compression level; and
adjust the compression level based on comparison between the second predicted CSI and the third measured CSI to be used for a measured CSI following the third measured CSI.

16. The communication apparatus of claim 14, wherein, the computer program is further executed to cause the one or more processors to:
determining the spatial parameter information for the second time instant based on the second measured CSI for the second time instant;
wherein, the compression level for the third measured CSI is determined further based on the spatial parameter information for the second time instant.

17. The communication apparatus of claim 14, wherein, the computer program is further executed to cause the one or more processors to:
determine the spatial parameter information for the second time instant based on the second measured CSI for the second time instant; and
determine a compression manner for the determined compression level, based at least on the spatial parameter information for the second time instant.

18. The communication apparatus of claim 14, wherein, the communication apparatus is an access point device, and the computer program is further executed to cause the one or more processors to:
determine a recovered CSI without compression of the third measured CSI, based on at least one of the second predicted CSI and the third measured CSI.

19. A non-transitory computer-readable storage medium, on which computer programs are stored, and when the computer programs are executed by a processor, the processor is caused to perform the steps of:
predicting a first predicted CSI for a second time instant based at least on a first measured CSI for a first time instant;
obtaining a second measured CSI for the second time instant; and
determining a compression level for a third measured CSI for a third time instant after the second time instant based at least on comparison between the first predicted CSI and the second measured CSI,
wherein determining the compression level for the third measured CSI, comprises:
determining a group of compression levels based on the comparison between the first predicted CSI and the second measured CSI; and
selecting the compression level for the third measured CSI from the group of compression levels based on spatial parameter information for the second time instant.

* * * * *